United States Patent [19]

Takami et al.

[11] Patent Number: 5,677,988
[45] Date of Patent: Oct. 14, 1997

[54] METHOD OF GENERATING A SUBWORD MODEL FOR SPEECH RECOGNITION

[75] Inventors: Jun-ichi Takami; Shigeki Sagayama, both of Kyoto, Japan

[73] Assignee: ATR Interpreting Telephony Research Laboratories, Kyoto, Japan

[21] Appl. No.: 532,318

[22] Filed: Sep. 21, 1995

Related U.S. Application Data

[63] Continuation of Ser. No. 953,354, Sep. 30, 1992, abandoned.

[30] Foreign Application Priority Data

Mar. 21, 1992 [JP] Japan ................................ 4-064296

[51] Int. Cl.$^6$ ........................................................ G10L 5/06
[52] U.S. Cl. ..................... 395/2.65; 395/2.64; 395/2.6; 395/2.63
[58] Field of Search ........................ 395/2.4, 2.47, 395/2.52, 2.58, 2.59, 2.65, 2.75

[56] References Cited

U.S. PATENT DOCUMENTS

| | | | |
|---|---|---|---|
| 4,783,804 | 11/1988 | Juang et al. | 381/43 |
| 4,819,271 | 4/1989 | Bahl et al. | 395/2.52 |
| 4,882,759 | 11/1989 | Bahl et al. | 395/2.52 |
| 5,072,452 | 12/1991 | Brown et al. | 395/2.65 |

FOREIGN PATENT DOCUMENTS

| | | |
|---|---|---|
| 0 312 209 | 4/1989 | European Pat. Off. . |
| 33 37 353 | 4/1984 | Germany . |
| 0271325 | 3/1990 | Japan . |

OTHER PUBLICATIONS

Rabiner, "A Tuturiol on Hidden Markov Models and Selected Applications in Speech Recognition", Proc. IEEE, vol. 77 No. 8 1989.

*Primary Examiner*—Allen R. MacDonald
*Assistant Examiner*—Vijay B. Chawan
*Attorney, Agent, or Firm*—Lowe, Price, LeBlanc & Becker

[57] ABSTRACT

An automated method of generating a subword model for speech recognition dependent on phoneme context for processing speech information using a Hidden Markov Model in which static features of speech and dynamic features of speech are modeled as a chain of a plurality of output probability density distributions. The method comprising determining a phoneme context class which is a model unit allocated to each model, the number of states used for representing each model, relationship of sharing of states among a plurality of models, and output probability density distribution of each model, by repeating splitting of a small number of states, provided in an initial Hidden Markov Model, based on a prescribed criterion on a probabilistic model.

7 Claims, 3 Drawing Sheets

INITIAL MODEL
SPLITING IN CONTEXTUAL DOMAIN
SPLITTING IN TEMPORAL DOMAIN
DETERMINATION OF METHOD OF SPLITTING PROVIDING HIGHEST LIKELIHOOD
HMM-NETWORK
SSS PRINCIPLE

EACH MODEL STRUCTURE

Step1: TRAINING OF INITIAL MODEL

Step 2: DETERMINATION OF SPLITEE STATE

Step 3-(1): STATE SPLITTING IN CONTEXTUAL DOMAIN

Step 3-(2): STATE SPLITTING IN TEMPORAL DOMAIN

Step 4: RE-ESTIMATION OF DISTRIBUTION

Step 5: CHANGE OF DISTRIBUTION

5,677,988

METHOD OF GENERATING A SUBWORD MODEL FOR SPEECH RECOGNITION

This application is a continuation of application Ser. No. 07/953,354 filed Sep. 30, 1992.

BACKGROUND OF THE INVENTION

1. Field of the Invention

The present invention relates to a method of generating a subword model for speech recognition. More specifically, the present invention relates to a method of generating a subword model for speech recognition in which unit, structure and various parameters of output probability density distribution of models are determined in an optimal manner for generating a model of high efficiency which allows modeling of maximum phonetic phenomena with minimum model parameters in speech recognition employing Hidden-Markov Model: HMM.

2. Description of the Background Art

In order to realize highly accurate and robust speech recognition by using HMM, simultaneous realization of generation of precise model and estimation of robust model is an important problem to be solved. For precise modeling, an allophone class covering entirely the speech parameter space must be appropriately determined, and in order to estimate highly robust model from limited training samples, a mechanism which can efficiently take information of training samples must be introduced.

Conventionally, in speech recognition using HMM, model unit, model structure and estimation of model parameters are determined independent from each other by using separate criteria. As for the criterion of the model unit, for example, it is determined based on knowledge (phoneme, demi-syllable, phoneme context) or it is determined based on distortion minimization (phoneme environment in phoneme environment clustering). The model structure is determined based on knowledge (whether the models are all the same or the models are represented by several structures), or it is determined based on state sharing with similarity used as a reference. The model parameters are determined by maximum likelihood estimation in accordance with the forward-backward algorithm. Accordingly, there is no consistency among the criteria, and optimality as a whole could not be ensured.

SUMMARY OF THE INVENTION

Therefore, an object of the present invention is to provide a method of generating a highly efficient subword model for speech recognition, in which the method of representing models is optimized by simultaneously and automatically determining the method under the same criterion of the maximum likelihood estimation as the estimation of model parameters, and in which maximum phonetic phenomenon is modeled with minimum model parameters.

Briefly stated, in the present invention, phoneme context class which is a model unit allotted to each model, the number of states used for representing each model, relation of sharing of the states among a plurality of models, and the output probability density distribution of each model are all determined based on the common criterion, by repeating splitting of a small number of states provided in the initial hidden markov model.

Therefore, according to the present invention, models can be successively made accurate, model unit, model structure and model parameters can be automatically optimized under the common criterion, and as a result, a subword model having high efficiency of representation can be generated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
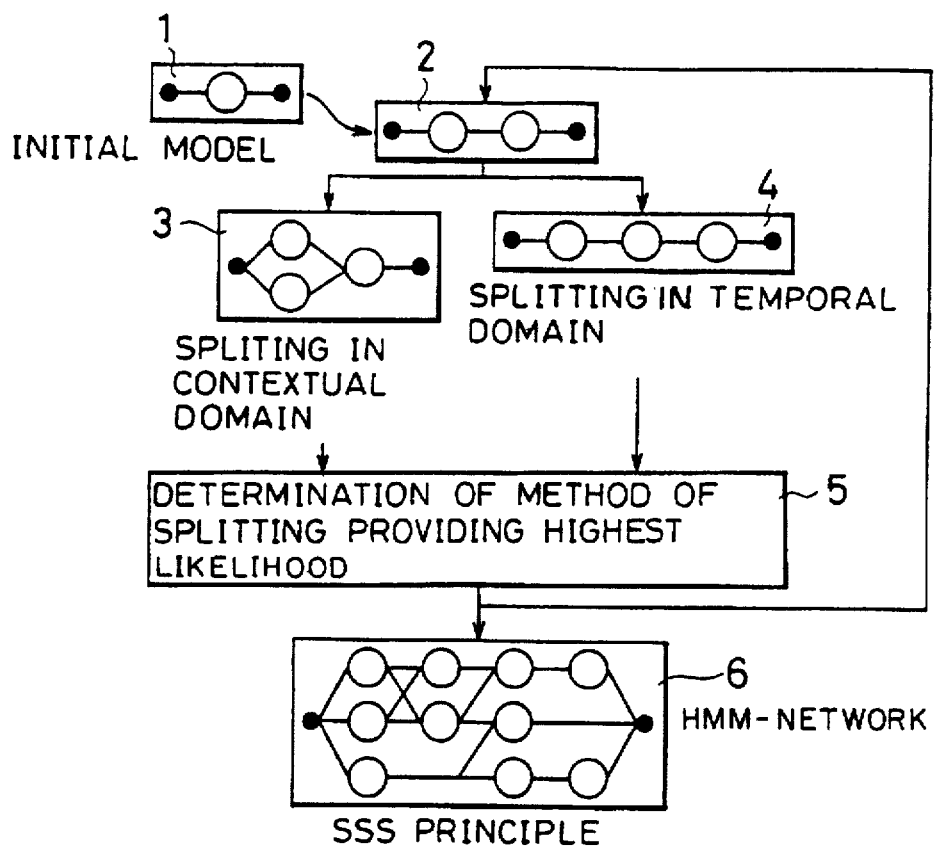
FIG. 1 is a schematic diagram showing the principle of the present invention.

FIG. 1 is a flow chart showing the principle of the present invention. The present invention aims to successively make accurate the models by repeating splitting each state based on a prescribed criterion (likelihood maximization) on a probabilistic model which is a representation of the shape (static feature of speech) and change in time thereof (dynamic feature of speech) in a short unit time of a feature pattern of the speech, represented as a chain of a plurality of output probability density distributions (states). Consequently, determination of model unit, determination of model structure and estimation of parameters of each state can be simultaneously realized under the common criterion.

The present invention will be described in greater detail with reference to FIG. 1. First, a model 2 comprised of only one state and one path connecting the state to the start and to the end is formed as an initial model 1 from all speech samples, and the operation starts from splitting this state.

State splitting at this time is carried out in connection with either the splitting in the contextual domain with incidental path splitting, or splitting 4 in temporal domain without path splitting, as will be described with reference to FIGS. 5 and 6. Especially at the time of splitting 3 in the contextual domain, the context classes allotted to respective paths incidental to path splitting are simultaneously splitted. As an actual method of splitting, a method of splitting is determined 5 by which method the total of likelihood when applied to speech samples becomes the largest among all methods of splitting available at this time, including the method of splitting the context class. By repeating such state splitting, a highly efficient model 6 which can attain high likelihood with small number state indexes, is generated.

The Hidden Markov Network which is automatically generated by the aforementioned successive state splitting can be represented as a network of a plurality of states. Each state can be regarded as one probabilistic statistical signal source in a speech parameter space, each holding the following pieces of information.

Figure 2:
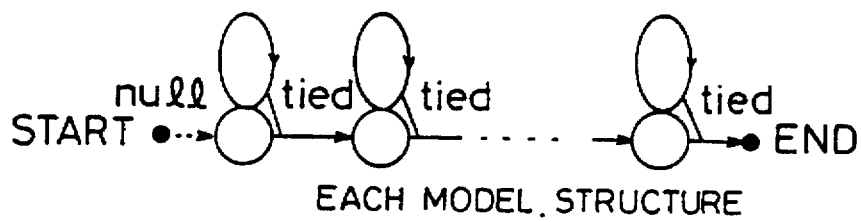
FIG. 2 shows a structure of a Hidden Markov Model.

(1) state index (2) context class which can be accepted (3) lists of preceding and succeeding states (4) parameters of probability distribution allocated on a feature parameter space of speech (5) self loop transition probability and transition probability to a succeeding state In the Hidden Markov Network, when input data and context information thereof are applied, the model for the input data can be determined in a unique manner by concatenating states which can accept that context in the constraint of the lists of the preceding and succeeding states. Since this model is equivalent to the Hidden Markov Model such as shown in FIG. 2, the forward path algorithm for calculating likelihood and the forward-backward algorithm for estimating parameters can be directly used as in an ordinary Hidden Markov Model.

An algorithm for realizing successive state splitting will be described in detail.

Figure 3:
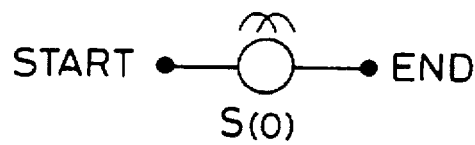
FIG. 3 is an illustration of training method of an initial model.

FIG. 3 is an illustration of a training method of an initial model. As an initial model, a Hidden Markov Model of one state (the index of this state is represented as 0 and the state of the state index 0 is represented as S(0)) having mixture gaussian density distribution (diagonal covariance matrix) with the number of mixtures being 2 is learned in accordance with the forward-backward algorithm by using all training data. At the same time, the information of all the context classes included in the training data are kept at respective states, and symbols indicating the start and the end are added to the list of preceding state and to the list of the succeeding states. Further, 1 is substituted for a variable m indicating the total number of states.

Figure 4:
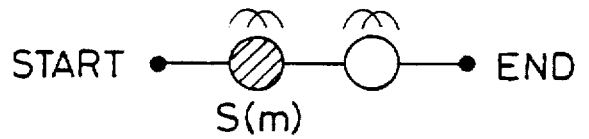
FIG. 4 is an illustration showing determination of splitee state.

FIG. 4 is an illustration showing determination of splitee state. For every state i existing at the time of learning the above described initial model, the magnitude $d_i$ of the distribution allocated to the state is calculated in accordance with the following equation (1), and a state in which the value of the magnitude $d_i$ of the distribution is the largest (represented as S(m)) is determined as the splitee state.

$$d_i = \sum_{k}^{K} \frac{\sigma_{ik}^2}{\sigma_{Tk}^2} n_i \quad (K: \text{parameter dimension}) \tag{1}$$

$$\sigma_{ik}^2 = \lambda_{i1}\sigma_{i1k}^2 + \lambda_{i2}\sigma_{i2k}^2 + \lambda_{i1}\lambda_{i2}(\mu_{i1k} - \mu_{i2k})^2$$

$\lambda_{i1}, \lambda_{i2}$: weight coefficient of two distributions of state i $\mu_{i1k}, \mu_{i2k}$: average of two distributions of state i $\sigma_{i1k}^2, \sigma_{i2k}^2$: variance of two distributions of state i $n_i$: number of phoneme samples used for estimation of state i $\sigma_{Tk}^2$: variance of all samples (coefficient for normalization)

The measure $d_i$ at this time is provided taking into account the value $\sigma_{ik}^2$ corresponding to the variance calculated when single gaussian density distribution is applied to the distribution of the state i as well as the number of phoneme samples $n_i$ used for estimating the distribution. As a result, further splitting of those samples for which only a small number of samples could be used for estimating the distribution becomes difficult, which improves statisticals robustness.

Figure 5:
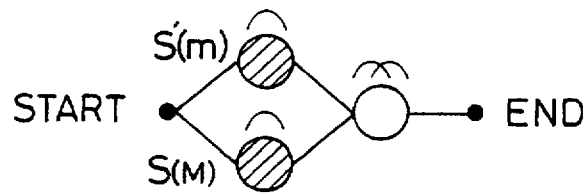
FIG. 5 is an illustration of state splitting in the contextual domain.
Figure 6:
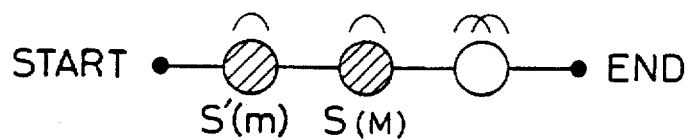
FIG. 6 is an illustration of state splitting in the temporal domain.

FIG. 5 is an illustration showing state splitting in the contextual domain, and FIG. 6 is an illustration showing state splitting in the temporal domain. The state S(m) shown in FIG. 4 is splitted into two states, that is, state S'(m) and state S(m), as shown in FIG. 5. At this time, two distributions allocated to the state S(m) are allocated as probability distribution parameters to these two states, respectively, and the values of the self loop transition probability and the transition probability to the succeeding state held by the state S(m) are copied as they are. As for the domain of state splitting, the maximum likelihood Pc provided when the actual phoneme sample is splitted in the contextual domain and the maximum likelihood Pt provided when it is splitted in temporal domain are respectively calculated, and the domain providing higher likelihood is employed. The values of the maximum likelihood Pc and Pt are calculated in accordance with the following method.

The state splitting in the contextual domain (calculation of Pc) is carried out by concatenating the state S'(m) and the state S(m) parallel to each other as shown in FIG. 5. At this time, the path which is one path connecting the start to the end is splitted simultaneously. Therefore, the speech sample Y, which has been represented by the path passing through the state S(m), must be distributed to a path passing through the state S'(m) and a path passing through the state S(m), which states are newly generated. This distribution is done by calculating factors j (preceding phoneme, phoneme in question, succeeding phoneme and so on) realizing the maximum value Pc calculated in accordance with the following equation (2) and by splitting the elements belonging to the factors j.

$$Pc = \max_{j} \sum_{l} \max(P_m(y_{jl}), P_M(y_{jl})) \tag{2}$$

j: factor which can be split in state S(m)

$e_{jl}$: lth element belonging to factor j $y_{jl}$: subset of Y having $e_{jl}$ as factor j $P_m(y_{jl})$: total likelihood when $y_{jl}$ is allocated to the path on S'(m)

$P_M(y_{jl})$: total likelihood when $y_{jl}$ is allocated to the path on S(M)

At the time when the factor j to be split is determined, distribution of the element $e_{jl}$ of the factor j, that is, to which pass this element is to be distributed, is determined in accordance with the following equation (3) using the values $P_m(y_{jl})$ and the total $P_M(y_{jl})$ of the likelihoods which have been already calculated in the course of calculating the equation (2).

$$\begin{cases} e_{jl} \in E_{mj} & (P_m(y_{jl}) \geq P_M(y_{jl})) \\ e_{jl} \in E_{Mj} & (P_m(y_{jl}) < P_M(y_{jl})) \end{cases} \tag{3}$$

$E_{mj}$: set of elements allocated to the path on S'(m)

$E_{Mj}$: set of elements allocated to the path on S(M)

After the sets $E_{mj}$ and $E_{Mj}$ of elements are determined, the set $E_{mj}$ of elements and the set $E_{Mj}$ of elements are allocated to portions related to the factor j, and to portions other than j, information held in S(m) is copied directly as context information of the states S'(m) and the state S(m).

The splitting in the temporal domain (calculation of Pt) is carried out by concatenating in series the states S'(m) and S(m) as shown in FIG. 6, and splitting with regard to the path is not carried out, since the number of paths is not changed. There are two possibilities of splitting, dependent on which of the states S'(m) and S(m) is positioned ahead. Therefore, with respect to the phoneme sample Y represented on the path passing through the state S(m), a method of realizing the maximum value Pt calculated in accordance with the following equation (4) is employed.

$$Pt = max(P_{mM}(Y), P_{Mm}(Y)) \qquad (4)$$

$P_{mM}(Y)$: total likelihood for Y when S'(m) is positioned ahead $P_{Mm}(Y)$: total likelihood for Y when S(M) is positioned ahead Since splitting of path is not incident to the splitting in temporal domain, the information held in the state S(m) is copied as it is as the context information of the states S'(m) and S(M).

Figure 7:
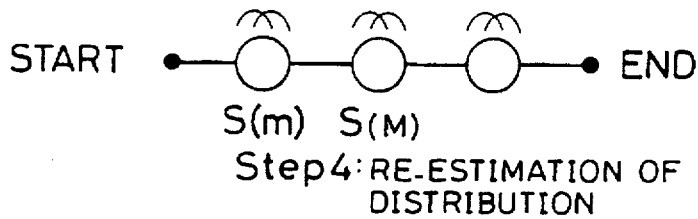
FIG. 7 is an illustration showing re-estimation of distribution.

FIG. 7 is an illustration showing re-estimation of distribution. At this time, single gaussian density distribution used in the splitting process has been still allocated to the distributions of the states S'(m) and S(M). Therefore, they are re-constructed to be mixture gaussian density having the mixture number of 2, and under that condition, probability distribution parameters and transition probability of the states are re-trained within the range of the influence of splitting of the state S(m) as shown in FIG. 7 in order to optimize the Hidden Markov Network. Thereafter, the state S'(m) is newly represented as S(m), and 1 is added to the variable M. The above mentioned processing of determination of splitee state and re-estimation of distribution is repeated until the variable M reaches a prescribed number of splitting.

Figure 8:
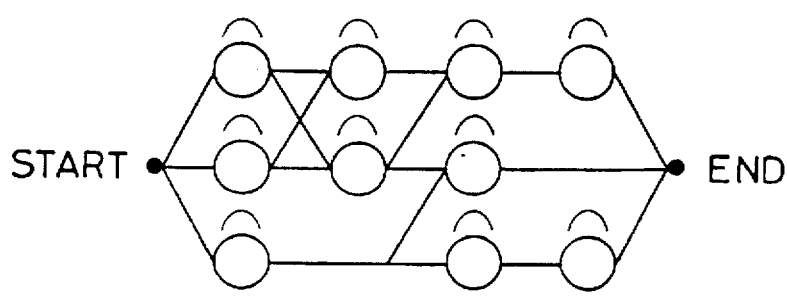
FIG. 8 is an illustration of a change of distribution.

FIG. 8 is an illustration showing the change of distribution. Determination of structure of the Hidden Markov Model is completed by the processes so far. Therefore, as a final step, training for changing the probability distribution allocated to each state to the final shape (which is not necessarily a single gaussian density distribution) which should be used in the actual Hidden Markov Network is effected on the whole Hidden Markov Network. Thus generation of Hidden Markov Network is completed.

Figure 9:
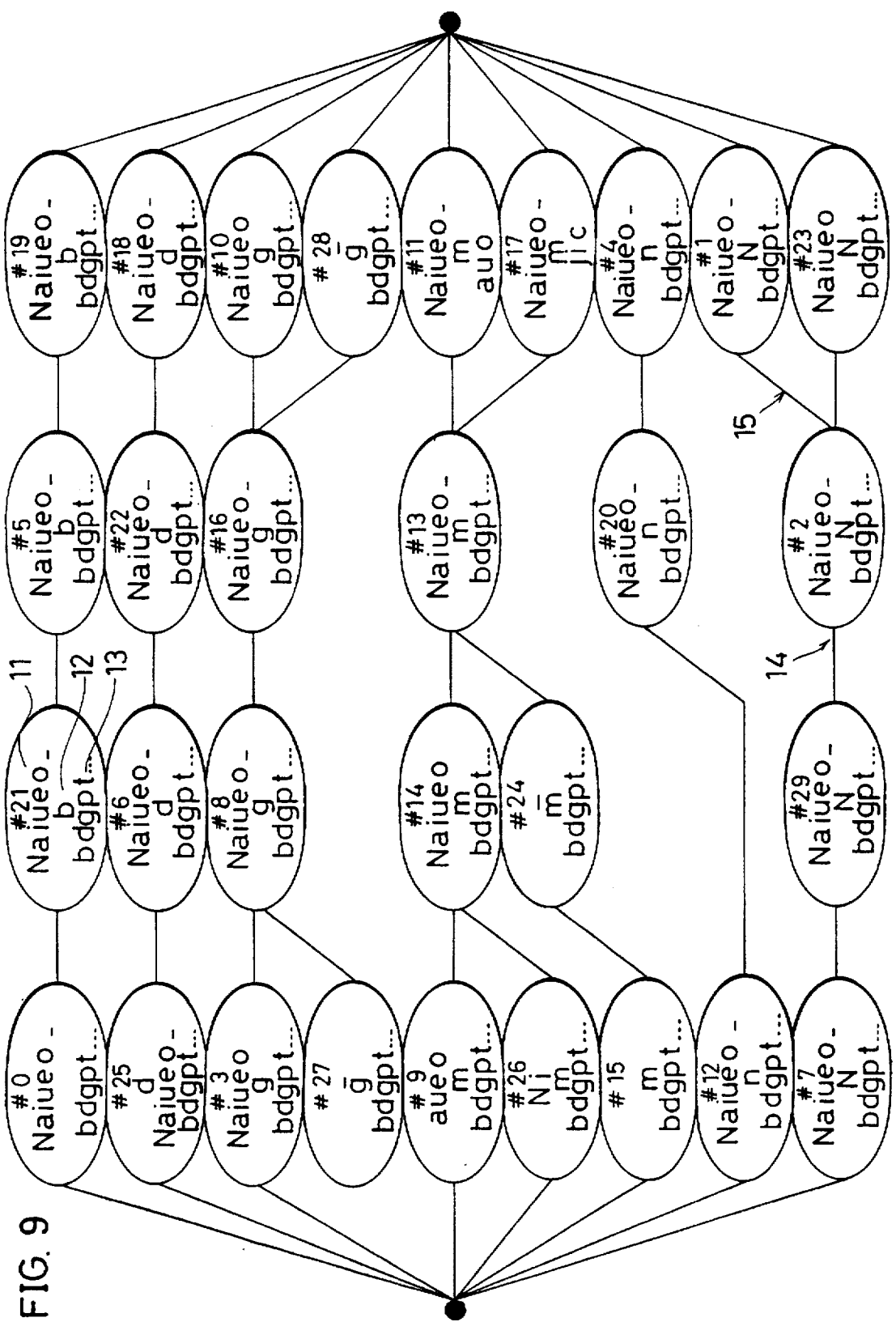
FIG. 9 is a specific example of a finally completed Hidden Markov Network.

FIG. 9 shows a specific example of the thus generated Hidden Markov Network. Referring to FIG. 9, the numerals with "#" are the state indexes, and numerals 11, 12 and 13 therebelow represents the set of the preceding phoneme, the set of the central phoneme and the set of the succeeding phoneme, respectively. Paths 14 and 15 represent preceding states and succeeding states for state #2. In this example, the state preceding to the state #2 is #29, and the succeeding states are #1 and #23.

As described above, according to the embodiment of the present invention, the model can be made more precise successively by repeating state splitting; model unit, structure and model parameters can be automatically optimized under the common criterion; and as a result, a subword model with high efficiency of representation can be generated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automated method of generating a subword model for speech recognition dependent on phoneme context for processing speech information using a Hidden Markov Model in which static features of speech and dynamic features of speech are modeled as a chain of a plurality of output probability density distributions, comprising the step of:

determining a phoneme context class which is a model unit allocated to each model, the number of states used for representing each model, relationship of sharing of states among a plurality of models, and output probability density distribution of each model, by repeating splitting of a small number of states, provided in an initial Hidden Markov Model.

2. The method according to claim 1, wherein splitting includes the step of splitting, in a parallel domain, one state into two states corresponding to different phoneme context classes to absorb change in the static features of speech derived from a difference of the phoneme context, and the step of splitting, in a serial domain, one state into two states corresponding to different phoneme segments to absorb change in the dynamic features of speech generated in a certain phoneme context class, and repeating state splitting in the domain which enables a higher value of an evaluation with respect to an actual speech sample to successively make the model structure more precise.

3. The method according to claim 2, further comprising the step of:

in state splitting in a contextual domain, splitting with respect to actual phoneme context class and allocating two split phonetic context classes, to attain a highest value of an evaluation with respect to the actual speech sample, to one of the two states respectively generated by state splitting to make the model unit successively smaller.

4. The method according to claim 1, further comprising the step of:

allocating a mixture gaussian density distribution having the mixture number of 2 as each output probability density distribution, and allocating a single gaussian distribution of one of two distributions constituting the mixture gaussian density distribution to two states newly generating by the state splitting, to realize significant reduction in an amount of calculation necessary for re-estimating output probability density distribution parameters after state splitting.

5. The method according to claim 4, further comprising the step of:

every time state splitting is executed, recovering the single gaussian distribution generated by state splitting to the original mixture gaussian density distribution having the mixture number of 2, and carrying out re-training to optimize model parameters.

6. The method according to claim 1, further comprising the step of:

prior to state splitting, calculating a magnitude of all states existing in a speech parameter space by determining a state having a largest magnitude as a splittee state, thereby significantly reducing an amount of calculation by avoiding a round robin type calculation necessary for determining an optimal splittee state.

7. The method according to claim 4, further comprising the step of:

after state splitting is completed and a final model unit and structure are determined, carrying out re-training to replace the mixture gaussian density distribution having the mixture number of 2, allocated to each state, by the output probability density distribution to be used in an actual Hidden Markov Network.

* * * * *